United States Patent [19]

Bienvenu

[11] 4,004,932
[45] Jan. 25, 1977

[54] ISOCYANATED POLYVALENT METAL SALTS OF OXIDIZED WAXES

[75] Inventor: Joseph O. Bienvenu, Longview, Tex.

[73] Assignee: Petrolite Corporation, St. Louis, Mo.

[22] Filed: Dec. 20, 1974

[21] Appl. No.: 534,682

[52] U.S. Cl. .................... 106/31; 106/270; 208/27
[51] Int. Cl.$^2$ .................. C09D 11/12; C09D 11/06
[58] Field of Search ............ 106/31, 270–272; 208/3, 27

[56] References Cited

UNITED STATES PATENTS 2,890,125  6/1959  Mange .................... 106/123

FOREIGN PATENTS OR APPLICATIONS 1,185,210  3/1970  United Kingdom
786,654  11/1957  United Kingdom Primary Examiner—Theodore Morris
Attorney, Agent, or Firm—Sidney B. Ring; Hyman F. Glass

[57] ABSTRACT

This invention relates to isocyanated polyvalent metal salts of oxidized non-benzenoid hydrocarbon waxes; and to uses thereof, particularly in carbon paper inks.

18 Claims, No Drawings

ISOCYANATED POLYVALENT METAL SALTS OF OXIDIZED WAXES

U.S. Pat. No. 2,890,125 relates to processes for treating oxidized hydrocarbon waxes with an organic isocyanate and the use of the resulting products in carbon paper inks and elsewhere. The processes as described in 2,890,125 are applied to solvent-extracted oxidized microcrystalline waxes in U.S. Pat. No. 2,890,124. U.S. Pat. No. 3,163,548 relates to the processes as stated in the above mentioned patents but includes an amidification reaction prior to the isocyanation to yield improved carbon ink waxes.

I have now discovered that isocyanated polyvalent metal salts of oxidized waxes are useful in carbon paper inks.

The present invention pertains to the isocyanation processes referred to in the above patents but the oxidized wax is first reacted with a polyvalent metal such as those of Periodic Table Groups II, IIA, IIIA and IV. Preferably, the polyvalent metal is an oxide or hydroxide of a divalent metal from Group IIA of the Periodic Table, or with an oxide or hydroxide of a monovalent metal from Group IA, followed by a base exchange with a di or multivalent metal such as those of Groups II, IIIA, and IV prior to the isocyanation. Waxes produced according to this invention exhibit superior carbon paper ink properties to that of isocyanated oxidized waxes, amidified and isocyanated waxes, and base treated oxidized waxes produced in accordance with procedures cited in my co-pending application, Ser. No. 534,678 filed Dec. 20, 1974 (D-74-60)

Oxidized hydrocarbons which are suitable for the purpose of this invention are petroleum waxes (microcrystalline and paraffin), alpha-olefins, synthetic waxes, such as Polywax-650, a hard polyethylene wax M.W.650, and Fischer-Tropsch wax, and certain polyethylenes and polypropylenes. Natural waxes such as plant waxes (carnauba, ouricury, candelilla, sugar cane, Douglas fir), and earth or peat waxes (Utah wax, Montan wax) are also suitable for the process, although inferior to the above products. As indicated in my copending application, Ser. No. 543,678, referred to above, these waxes have melting points of 120° F to 230° F prior to oxidation.

The preferred types of oxidized hydrocarbons are the hard waxes such as microcrystalline wax, C30+ alpha-olefin fraction, Polywax-650, and Fischer-Tropsch wax with melting points within the range of 160° F to 220° F prior to oxidation.

Petroleum waxes which are suitable for the purpose of this invention are tank bottom derived microcrystalline wax, plastic microcrystalline wax, and paraffin wax. The preferred types are the tank bottom derived microcrystalline wax with a melting point within the range of 175° F to 200° F, and the plastic microcrystalline wax with a melting point between 165° F and 175° F. Paraffin wax may be used, but better results are obtained if the wax is blended with higher molecular weight material.

The alpha-olefins referred to in this invention are preferably the straight chain olefins produced by the polymerization of ethylene as described in "Polymerization and Polycondensate Processes," Advances in Chemistry, Series No. 34 (American Chemical Society, 1962), and by Zeiss, Organo-Metallic Chemistry (Reinhold, 1960). The preferred fraction is the C30+ alpha-olefin fraction. Lower molecular weight fractions can be used, however, it is advantageous to blend these with higher molecular weight wax and/or polyethylene.

Synthetic hydrocarbon waxes which are applicable in this invention are the intermediate molecular weight polymers derived from the polymerization, copolymerization, and telomerization of ethylene, polypropylenes, or products of the Fischer-Tropsch synthesis of hydrocarbons from carbon monoxide and hydrogen mixtures. Two commercially available products typifying the above groups are Polywax-650 and Paraflint wax. Polywax-650 with a melting point of approximately 210° F, and Paraflint wax, a Fischer-Tropsch wax with a 220° F melting point, are desirable products for this invention. The higher molecular weight polywaxes can be blended with lower molecular weight waxes and other hydrocarbons such as wax oils for use in this invention.

Polyethylenes of this invention are the various polymers derived from the polymerization of ethylene such as described in U.S. Pat. No. 2,504,400, dated Apr. 18, 1950, U.S. Pat. No. 2,699,457, dated Jan. 11, 1955, Phillips Petroleum Company's Belgian Pat. No. 530,617, dated July 22, 1954, and Kirk-Othmer, Encyclopedia of Chemical Technology, volume 10, pp 938–957. Lower molecular weight polyethylenes may be used, but the higher molecular weight polymers, because of their higher viscosity, are best blended with other waxes. Polypropylenes, polybutylenes, and other olefin polymers and copolymers may also be used in wax blends for the purpose of this invention.

The art of oxidizing inert hydrocarbon waxes such as those described above is well known and has been extensively described in the literature.

The preferred type of oxidation for the purpose of this invention is air oxidation, with or without oxidation catalyst, at temperatures ranging from 240° F to +320° F. A wax or blend may be modified prior to or after the oxidation by processes such as solvent extraction, hydrogenation, polymerization and cracking. Depending on the susceptibility of the precursor to air oxidation, catalysts such as soluble or insoluble organic salts may be used in concentrations of 0.2 percent to approximately 2 percent. The preferred oxidation catalysts are cobalt, manganese, and zinc soaps such as the naphthenates, octoates, oleates, and stearates. Oxidation time or degree of oxidation is dependent on the type of product desired.

The organic polyisocyanates, and more specifically the diisocyanates (containing two distinct and separate —N=C=O groups) are the preferred isocyanates for this invention. Representative isocyanates of this type are the polymethylene diisocyanates, the alkylene diisocyanates, the alkylidine diisocyanates, the heptylidene diisocyanates, the cycloalkylene diisocyanates, the aromatic diisocyanates, and the aliphatic-aromatic diisocyanates. Representative compounds of these groups are: (1) ethylene diisocyanate, trimethylene diisocyanate, tetramethylene diisocyanate, pentamethylene diisocyanate; (2) propylene-1,2-diisocyanate, butylene-1,2-diisocyanate, butylene-1,3-diisocyanate, butylene-2,3-diisocyanate; (3) ethylidene diisocyanate, butylidene diisocyanate, heptylidene diisocyanate; (4) cyclopentylene-1,3-diisocyanate, cyclohexylene-1,2-diisocyanate, cyclohexylene-1,4-diisocyanate; (5) m-phenylene diisocyanate, p-phenylene diisocyanate, 1-methylphenylene-2, 4-diisocyanate, 1-methylphenylene-2,6-diisocyanate, 3,3 bitolylene-4,4-diisocyanate, naphthylene-1,4-diisocyanate, naphthylene-1,5- diisocyanate; (6) xylylene-1, 4-diisocyanate, xylylene-1,3-diisocyanate, 4,4-diphenylenemethane diisocyanate, and 4,4-diphenylene propane diisocyanate.

Substituted derivatives of the above isocyanates, polyisothiocyanates, and compounds containing more than two —N=C=O groups such as 1,2,4-benzene triisocyanate may be used, however, the preferred isocyanates are the diisocyanates listed in the above paragraph.

Prepolymers prepared with diisocyanates and terminating in isocyanate groups can undergo usual isocyanate reactions and may be used in the process. Prepolymers containing terminal isocyanate groups may be prepared from diisocyanates and diols such as ethylene, propylene and butylene glycols; polymers of the glycols such as polyethylene, polypropylene, polybutylene, polyoxyethylene, polyoxypropylene, and polyoxybutylene glycols; hydroxyl terminated polyesters, di and polyamines, alkanolamines, and other polyhydric compounds.

The degree of oxidation of the hydrocarbon wax may vary from acid number of about 3 to 60 and a saponification number of about 15 to 150, but preferably an acid number of about 5 to 20 and a saponification number of about 10—60. Products with greater acid number may be used but for reasons of economy the lower acid number products are preferred. Concentration of the metal may vary from approximately the acid number equivalent to approximately the saponification number equivalent of the oxidized wax.

Any suitable polyvalent metal can be reacted with the oxidized wax, for example those of the following groups of the Periodic Table: II, IIA, IIIA and IV. For example, an oxidized wax is reacted with the oxide or hydroxide of a divalent metal of Group IIA of the Periodic Table, or with an oxide or hydroxide of a metal from Group IA followed by a double decomposition reaction with a di or multivalent metal salt such as those of Groups II, IIIA, and IV. The resulting product is then reacted with an organic diisocyanate.

The following examples describe the process more specifically and illustrate various applications of the process.

EXAMPLE 1

A blend consisting of 50% C-700 wax (a tank bottom derived microcrystalline wax with a melting point of 196° F) and 50% Polywax-650 (a synthetic wax, 210° F melting point) is charged to an oxidizer and 0.2% cobalt naphthenate is added. Air is admitted through a sparger at a rate of 4 cc/minute/g wax. Temperature is adjusted to 290°–300° F, and the wax oxidized to 15–18 acid number (40–50 saponification number) in 10–15 hours. The oxidized wax is transferred to a reactor and the temperature adjusted to 205°–210° F. Water (0.25% wt. basis) is added, then 1.3% of calcium hydroxide is added and reacted for 15–30 minutes with agitation at 205°–210° F. Water is removed by increasing temperature to 240° F and applying vacuum. Temperature is adjusted to 235° F and 5% of tolylene-2, 4-diisocyanate (1 methyl phenylene-2,4-diisocyanate) is added and reacted at 240° F for 6 hours.

The nature of the product is dependent on the degree of oxidation, and the amount of the reactants employed. Depending on the type of product desired, the degree of oxidation and the amount of the base and isocyanate employed may vary. The amount of the base may vary from approximately the acid number equivalent to approximately the saponification number equivalent of the oxidized wax. However, with high acid number waxes the amount may have to be decreased to compensate for the increase in viscosity. Percent isocyanate reacted, based on weight of wax, may vary from about 1 to 10 but preferably from about 1 to 5 percent. Preferably, the degree of oxidation may vary from approximately 5 acid number to 20 acid number. Higher acid number products may be used, but for reasons of economy, the lower acid number products are preferred. Following are examples (1a–1d) which illustrate to a certain extent how the above procedure may be modified.

EXAMPLE 1a

To the oxidized wax, as described in Example 1, is added 0.25% of water and 2.1% of calcium hydroxide. The reaction is continued for 15–30 minutes at 205°–210° F, then water is removed by heating to 240° F and applying vacuum. Temperature is adjusted to 235° F, and 5% of tolylene-2,4-diisocyanate is added and reacted at 240° F for 6 hours.

EXAMPLE 1b

The oxidized wax as described in Example 1 is treated with 0.25% of water, and 1.3% calcium hydroxide at 205°–210° F for 15–30 minutes. Water is removed by heating to 240° F under vacuum. Temperature is then adjusted to 235° F, and 1% of tolylene-2,4-diisocyanate added and reacted at 240° F for 6 hours.

EXAMPLE 1c

A wax blend is oxidized to 6 acid number (16 saponification number) in 4–5 hours according to the oxidation procedure described in Example 1. The temperature is adjusted to 205°–210° F, and 0.25% water and 0.33% calcium hydroxide are added and reacted for 15–30 minutes. Water is removed by distilling under vacuum at 240° F. Temperature is adjusted to 235° F, and 5% of tolylene-2,4-diisocyanate is added and reacted at 240° F for 6 hours.

EXAMPLE 1d

The wax blend of Example 1 is oxidized to 11 acid number (28 saponification number) in 8 hours, then reacted with 0.25% water, 0.7% calcium hydroxide, and 5% tolylene-2,4-diisocyanate according to the procedures described in the above examples.

EXAMPLE 2

Carnauba (T4-Filtered) wax is charged to a reactor and heated to 205°–210° F. Water (0.25% wt. basis) and 0.9% of calcium hydroxide are added and reacted at 205°–210° F for 15–30 minutes. The water is then removed by distilling under vacuum at 240° F. Temperature is adjusted to 235° F and 5% of tolylene-2,4-diisocyanate is added and reacted for 6 hours at 240° F.

EXAMPLE 3

A C-30+ alpha-olefin fraction with a melting point of 178° F is oxidized without catalyst at 265° F according to the procedure described in Example 1. The oxidized wax is reacted with 0.25% water and 1.5% calcium hydroxide for 15–30 minutes at 205°–210° F. Water is removed by distilling under vacuum at 240° F. Temperature is adjusted to 235° F, then 5% of the tolylene-2,4-diisocyanate is added and reacted at 240° F for 6 hours.

EXAMPLE 4

A C-30+ alpha-olefin fraction is oxidized as described in Example 3, then reacted with 1.25% of sodium hydroxide (30% solution) at 205°–210° F with agitation for 15–30 minutes. 1.5% of calcium chloride (40% solution) is added and reacted for 10–15 minutes. The wax is washed twice with water, then dried by either distilling under vacuum at 250° F or stripping with nitrogen at 250° F. Temperature is adjusted to 235° F, and 5% of tolylene-2, 4-diisocyanate is added and reacted at 240° F for 2 hours.

In the above examples, the isocyanate reaction may be modified by reacting the isocyanate for 1 hour at 240° F, then adding approximately 0.25% of an amine such as triethylene diamine and reacting for an additional 30 minutes at 240° F. Also, the thermal stability of the finished product may be improved by incorporating 0.5 to 2.0% of a polyetherpolyol prior to or during the isocyanation. Alkanolamines or other multi-fractional hydroxyl compounds such as trimethylolpropane may be used. As indicated in the process, other bases and metal salts may be used. For example, zinc or aluminum salt when substituted for the calcium salt in Example 4 produced a product with excellent carbon ink properties. These products may be more desirable than the product derived with the calcium salt in certain applications.

As indicated by the data in Table I, the resulting products of the above examples prepared with oxidized hydrocarbons are excellent carbon ink waxes. When milled with conventional other components of carbon paper inks, including pigments and oil, as exemplified in Procedures I and II, below, these waxes yielded low viscosity (little thixotropy) carbon inks with good pigment dispersion. The inks displayed good flow, and oil retention properties. Products prepared with natural waxes, as illustrated with carnauba wax in Example 2, are inferior to the above products, however, the reacted products are very superior to the original waxes. Unreacted carnauba wax gelled during the performance test as described in Procedure I. Other natural waxes, such as Douglasfir bark wax, showed good improvement after treating according to the procedure described in Example 1.

Waxes produced according to the procedures of this invention are greatly superior to comparable isocyanated or amidified and isocyanated products. Isocyanated or amidified and isocyanated synthetic, petroleum and natural waxes yielded inks which gelled during the formulation of the performance test (Procedure I).

Carbon ink properties of a wax are determined by testing the wax in a medium intensity black ink formulation as described in the following procedure. Some waxes were also tested in a more critical blue ink formulation which is also described.

| Procedure I (Black Ink Formula) | |
|---|---|
| | Parts by Weight |
| Materials: | |
| Wax of this invention | 12.0 |
| Paraffin, 142° F M.P. | 30.0 |
| Methyl Violet Base | 0.1 |
| Furnace Black | 22.0 |
| Toning Iron Blue | 3.0 |
| Mineral Oil, 100 SUS | 32.9 |

A mixture consisting of the wax, paraffin, and methyl violet is heated in an oven at 220°–230° F for 2 hours, then charged to a steel ballmill and milled at 220°–230° F for 5 minutes. A mixture comprising the carbon black, iron blue, and mineral oil which was previously heated to 220°–230° F is added to the wax in the mill, and then milled at 220°–230° F for 30 minutes. The ink is sampled in a glass jar (13.5 cm × 5.5 cm diameter) for viscosity determinations, and another sample is obtained in an aluminum weighing dish (2 cm × 6 cm diameter) for an oil-retention penetration.

Viscosity values of the ink are determined at 6, 12, 30, and 60 RPM at 215° F with a Brookfield viscometer and No. 1 spindle. The ink sample is aged in an oven at 220° F for 17 hours, and viscosity measurements are again determined at 6, 12, 30, and 60 RPM at 215° F.

The sample of ink in the aluminum weighing dish is aged at 77° F for 17 hours, and the hardness of the ink is determined according to ASTM method D-1321.

| Procedure II (Blue Ink Formula) | |
|---|---|
| | Parts by Weight |
| Materials: | |
| Wax of this invention | 2 |
| Ceraweld Wax, 172/178° F M.P. | 20 |
| Paraffin, 142° F M.P. | 38 |
| Iron Blue | 15 |
| Mineral Oil, 100 SUS | 25 |

The ink is formulated and tested as described in the above procedure.

TABLE I

Performance of Wax in Procedure I

| Example No. | Ink Viscosity (Initial/aged)[1] | | | | Oil Retention-Penetration |
|---|---|---|---|---|---|
| | 6RPM | 12RPM | 30 RPM | 60RPM | |
| Number 1 | 13/12 | 12/11 | 13/21 | 13/13 | 25 |
| Number 1[2] | 13/13 | 12/13 | 13/14 | 14/14 | 27 |
| Number 1a | 14.12 | 14.12 | 15/14 | 15/14 | 23 |
| Number 1b | 14/25 | 15/22 | 15/21 | 15/21 | 26 |
| Number 1c | 13/43 | 14/38 | 15/33 | 15/30 | 26 |
| Number 1d | 12/16 | 12/16 | 12/16 | 13/15 | 24 |
| Number 2 | 38/470 | 40/307 | 34/174 | 30/100+ | 18 |
| Number 3 | 16/19 | 15/18 | 16/19 | 16/18 | 24 |
| Number 4 | 15/24 | 15/23 | 14/21 | 14/20 | 25 |

Note [1] Brookfield, cps at 210–215° F.
Note [2] Duplication of Example 1 with a higher acid number wax.

TABLE II

| Example No. | Performance of Wax in Procedure 2 | | | | Oil Retention Penetration |
|---|---|---|---|---|---|
| | Ink Viscosity (Initial/aged)[1] | | | | |
| | 6 RPM | 12 RPM | 30 RPM | 60RPM | |
| Number 1 | 8/7 | 8/7 | 9/8 | 10/10 | 45 |
| Number 1a | 7/8 | 7/6 | 9/8 | 10/10 | 41 |
| Number 4 | 8/8 | 8/8 | 8/7 | 9/9 | 39 |

Note [1] Brookfield, cps at 210–215° F

TABLE III

| Example | Oxidized Wax | | Finished Product | |
|---|---|---|---|---|
| | Acid Number | Sap. Number | Acid Number | Sap. Number |
| Example 1 | 15.7 | 43.7 | 2.0 | 40.6 |
| Example 1 | 20.9 | 55.0 | 3.3 | 48.6 |
| Example 1a | 17.0 | 50.5 | 4.5 | 30.7 |
| Example 1b | 20.8 | 63.1 | 7.3 | 46.9 |
| Example 1c | 6.5 | 15.7 | 0.8 | 11.7 |
| Example 1d | 11.4 | 27.8 | 1.8 | 27.1 |
| Example 2 | 8.2 | 80.2 | 3.5 | 75.8 |
| Example 2 | 17.9 | 63.0 | 1.9 | 62.0 |
| Example 4 | 18.4 | 50.0 | 3.6 | 49.2 |

OTHER USES

The products of the invention have been characterized as carbon paper ink waxes, however, they are also suitable for use in other inks such as news ink, flexographic ink, rotogravure ink, and screen ink. These products may be used in solvent inks, protective coatings, mold release compounds, and various types of polishes such as floor polish, shoe polish, furniture polish, and car polish. Products of the invention may be further modified by incorporating a monovalent metal, preferably potassium or lithium, for use in ink and polish formulations.

I claim:
1. An isocyanated polyvalent metal salt of an oxidized non-benzenoid hydrocarbon wax characterized as follows:
   1. Said wax having a melting point of 120°–230° F prior to oxidation;
   2. Said wax having an acid number of about 5–20 and/or a saponification number of about 10–60 after oxidation.
2. The composition of claim 1 where the wax prior to oxidation has a melting point of about 160°–220° F.
3. The composition of claim 2 where the polyvalent metal is a member of the following groups of the Periodic Table: II, IIA, IIIA, and IV.
4. The composition of claim 1 where the polyvalent metal is calcium, zinc or aluminum and the polyisocyanate is a diisocyanate.
5. The composition of claim 4 where the wax is a microcrystalline wax, an alpha-olefin wax, a Fischer-Tropsett wax, a polyethylene type wax or mixtures thereof.
6. A carbon paper ink containing the composition of claim 1.
7. A carbon paper ink containing the composition of claim 2.
8. A carbon paper ink containing the composition of claim 3.
9. A carbon paper ink containing the composition of claim 4.
10. A carbon paper ink containing the composition of claim 5.
11. The composition of claim 3 where the isocyanated product is that obtained by reacting the polyvalent metal salt with an organic polyisocyanate.
12. A carbon paper ink containing the composition of claim 11.
13. A carbon paper ink containing the composition of claim 1, a pigment and an oil.
14. A carbon paper ink containing the composition of claim 2, a pigment and an oil.
15. A carbon paper ink containing the composition of claim 3, a pigment and an oil.
16. A carbon paper ink containing the composition of claim 4, a pigment and an oil.
17. A carbon paper ink containing the composition of claim 5, a pigment and an oil.
18. A carbon paper ink containing the composition of claim 11, a pigment and an oil.

* * * * *

UNITED STATES PATENT AND TRADEMARK OFFICE
CERTIFICATE OF CORRECTION

PATENT NO. : 4,004,932

DATED : January 25, 1977

INVENTOR(S) : Joseph O. Bienvenu

It is certified that error appears in the above-identified patent and that said Letters Patent are hereby corrected as shown below:

Columns 5 and 6, in TABLE I, first line in column of said TABLE I headed by "30RPM", change "13/21" to

--- 13/12 ---

Column 8, line 21, change "Tropsett" to

--- Tropsch ---

Signed and Sealed this

Twenty-sixth Day of April 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,004,932
DATED : January 25, 1977
INVENTOR(S) : Joseph O. Bienvenu It is certified that error appears in the above-identified patent and that said Letters Patent are hereby corrected as shown below:

Claim 4, line 1, change "claim 1" to

--- claim 11 ---

Signed and Sealed this

Fifteenth Day of November 1977

[SEAL]

Attest:

RUTH C. MASON
Attesting Officer

LUTRELLE F. PARKER
Acting Commissioner of Patents and Trademarks